United States Patent [19]

Bergishagen et al.

[11] 3,924,455
[45] Dec. 9, 1975

[54] METHOD OF REMOVING BRITTLE LACQUER STRESS COATINGS AND STRIPPING COMPOSITIONS THEREFOR

[75] Inventors: Finn Bergishagen, Union Lake; James J. Schmidt, Livonia, both of Mich.

[73] Assignees: Dana Corporation, Toledo, Ohio; Product-Sol, Inc., Birmingham, Mich.

[22] Filed: Nov. 20, 1974

[21] Appl. No.: 525,379

[52] U.S. Cl. .................................................. 73/88
[51] Int. Cl.² ...................... G01B 5/30; G01B 7/16
[58] Field of Search ........................... 73/88; 134/38

[56] References Cited
UNITED STATES PATENTS

| | | | |
|---|---|---|---|
| 2,310,845 | 2/1943 | Ellis | 73/88 R |
| 2,724,964 | 11/1955 | Singdale | 73/88 R |

*Primary Examiner*—Herbert Goldstein
*Assistant Examiner*—Anthony V. Ciarlante
*Attorney, Agent, or Firm*—Harness, Dickey & Pierce

[57] ABSTRACT

A method for removing brittle lacquer stress coatings from the surfaces of plastic models composed of polyvinyl chloride resin without injury to the substrate and without causing any modification in the mechanical properties thereof, rendering the model reuseable for further stress analysis testing. The invention also encompasses a novel liquid stripping composition.

6 Claims, No Drawings

METHOD OF REMOVING BRITTLE LACQUER STRESS COATINGS AND STRIPPING COMPOSITIONS THEREFOR

BACKGROUND OF THE INVENTION

The present invention is applicable to the brittle coating stress analysis method in which the pattern of cracks formed in the brittle coating applied to a structural component under load is indicative of the concentration and direction of the stresses developed in the underlying structural substrate. This stress analysis technique is in widespread use for assisting engineers and designers of structural components in arriving at a final design which provides optimum performance at the least cost. In many instances, the brittle coating stress analysis technique is utilized during the initial design phase of structural components employing prototype models fabricated from plastic in full size or as accurate fractional scale models which are subjected to a nondestructive testing to evaluate critical stress areas under a variety of load conditions. A material which has been found particularly satisfactory for fabricating such plastic models or prototypes is a rigid polyvinyl chloride resin, preferably in an unfilled condition, which is available in a wide variety of shapes and forms and can readily be formed into a variety of final structural configurations by hot vacuum forming. Simulation of welds can also be performed by heat softening adjoining surfaces of the polyvinyl plastic, effecting a fusion thereof and the resultant structure is substantially devoid of any residual stresses due to the stress-relieving characteristics of the hot forming techniques employed.

A continuing problem associated with the nondestructive testing of such polyvinyl chloride plastic models is the inability to remove all or selected portions of the brittle lacquer coating at the completion of a test to enable reuse of the model without causing physical injury to the substrate and/or an alteration of the mechanical properties of the structure. The removal of such brittle lacquer coatings is desirable to enable the installation of strain gauges at critical stress locations, enabling a quantitative determination of the magnitude of stresses imposed on the prototype, as well as enabling recoating of the model with similar brittle lacquer stress coatings to evaluate changes in stress patterns resulting from variations in static loading and structural alterations incorporated in the plastic prototype.

In accordance with prior art practices, a scoring or damage to the surfaces of the polyvinyl chloride plastic substrate occurs as a result of a mechanical removal of the coating, such as by scraping, while various solvent mixtures heretofore employed have also adversely attacked the plastic substrate, altering the dimensions thereof, as well as the mechanical properties of the plastic material, preventing reuse of the model. It has been necessary, in accordance with prior art practices, to fabricate a new plastic prototype for each series of tests, which constitutes a costly and time consuming procedure. This problem is overcome in accordance with the present invention by which the brittle lacquer coating, as well as any reflective undercoating employed, can be completely and harmlessly removed from the surfaces of the model without injury or alteration of its physical properties, rendering it reuseable for further testing.

SUMMARY OF THE INVENTION

The benefits and advantages of the present invention are achieved by applying a liquid stripping composition to all or selected areas of a model having a brittle lacquer coating on the surfaces thereof and continuing the application until all of the lacquer coating is solubilized, exposing the original uncoated substrate. The liquid stripping composition is compatible with the polyvinyl chloride substrate, even after short periods of immersion of the plastic in the liquid stripper and does not physically or chemically alter the characteristics of the plastic material. The liquid stripping composition comprises a mixture of selected ingredients present in controlled amounts including from about 5% to about 30% of a halogenated solvent, from about 20% to about 40% of a glycol ether, from about 20% to about 60% mineral spirits, up to about 10% of a $C_1$ to $C_4$ alcohol and up to 10% of a surfactant.

Additional benefits and advantages of the present invention will become apparent upon a reading of the description of the preferred embodiments considered in conjunction with the specific examples provided.

DESCRIPTION OF THE PREFERRED EMBODIMENTS

The composition of the liquid stripping material as herein described and as set forth in the subjoined claims is expressed in terms of percentages by weight unless clearly indicated to the contrary.

The method and liquid stripping composition of the present invention are applicable for the removal of brittle lacquer coatings from plastic substrates, and particularly those comprised of rigid polyvinyl chloride plastics, which preferably are in the unfilled condition. The polyvinyl chloride, or PVC, material constitutes an ideal substance for fabricating prototype models due to the large variety of stock sizes and shapes in which the material is commercially available. This is particularly important in enabling the fabrication of such models to accurate scaled dimensions relative to the dimensions and thicknesses of the ultimate steel or metal structure. This plastic also is of relatively uniform and constant modulus of elasticity in tension of approximately 450,000 psi/inch$^2$, enabling correlation of stress analyses conducted on different models made of the same material. The PVC material also is easily formed due to its thermal plasticity into intricate shapes such as by vacuum forming, which upon cooling produces a stress-relieved structure devoid of any significant residual stresses. The PVC plastic can also simulate welded connections by fusing structural components together, thereby simulating stress patterns present in welded structures. A particularly satisfactory PVC material comprises a rigid unfilled polyvinyl chloride plastic commercially available from Union Carbide Corporation under the designation 3310. It will be appreciated that while the invention is described in relationship to PVC plastic materials, the method and liquid stripping composition is equally applicable to other plastic compositions which are of a thermoplastic nature and are of similar sensitivity or susceptibility to chemical attack and plasticizer leaching when exposed to strong solvent compositions.

The surface of the plastic structural prototype composed of PVC is first cleaned prior to the application of the brittle lacquer coating thereon. Cleaning is effected employing mild soap solutions or compatible solvents such as alcohol, for example, in order to remove any residual contamination and dirt from the surfaces to be coated. It is conventional practice, particularly when the surface of the substrate is of a dark color, to apply a base or undercoat containing a reflective filler, such as aluminum, over which the brittle lacquer coating is applied. The use of such a reflective undercoat accentuates the cracks developed in the overlying brittle lacquer coating, facilitating a visual inspection and photographing of the stress patterns. Typically, the undercoat or base coat contains as its essential ingredients, a nitrocellulose filmforming resin dissolved in a solvent such as ethyl acetate or carbon disulfide and incorporating metallic reflective particles, such as aluminum pigment, which upon drying produces an adherent coating on the PVC substrate over which the brittle lacquer coating is applied. The application of the base coat preferably is achieved by spraying to achieve uniformity in thickness, which may range from as little as 0.001 inch to several thousandths inch in thickness. In lieu of ethyl acetate or other volatile flammable solvents, the base coat lacquer coating may incorporate nonflammable solvents, such as bromochloromethane, dichloromethane or the like, for safety in use of the material. An aluminum pigmented lacquer base coat incorporating an ethyl acetate solvent is commercially available from Magnaflux Corporation under the designation ST-840, while a similar nonflammable coating is available from the same source under the designation NFST-850. A nonflammable base coat is also commercially available under the designation U-10 from Photolastic Inc.

The brittle lacquer coating may comprise any of the ones available commercially from Magnaflux Corporation under the designation ST-10 through ST-100 series, which essentially comprise terpene resins extracted from wood which are dissolved in a carbon disulfide solvent, as well as nonflammable solvents such as bromochloromethane, dichloromethane or the like, available under the designation NFST-10 through NFST-100 series. The terpene resins generally correspond to the empirical chemical formula $C_{10}H_{16}$ occurring in most essential oils and oleo-resins of plants. A series of nonflammable brittle lacquer coatings are also available commercially from Photolastic Inc. under the designation Tens-Lac Type TL-500-40-X through TL-500-100-X. The range of lacquer coatings vary in brittleness to accommodate the specific humidity and temperature conditions present in the test environment and the brittleness of the lacquer is varied accordingly by the incorporation of varying amounts of plasticizer during its formulation so as to produce wood resin films of different failure characteristics. The brittle lacquer coating is preferably spray-applied to the substrate in amounts ranging from as little as 0.002 up to about 0.010 inch thick, while thicknesses of about 0.003 to about 0.005 inch are preferred. The coatings are permitted to air dry or drying may be accelerated by employing higher temperatures of about 100°F but below about 140°F to accelerate drying, which at the higher temperatures is completed within an hour or two.

The resultant coated part is thereafter subjected to the static or dynamic loading in the usual manner, and the resultant crack patterns observed as indicative of the direction of strain and concentrations of stress in the structure. A visual or photographic recording of the stress patterns can be made, whereafter the stripping liquid is applied for removing all or selective portions of the stress coat, as well as the reflective undercoat, if used, enabling the attachment of strain gauges to the substrate or a recoating of the part with fresh undercoat and overlying brittle lacquer for retesting under the same or different selected load conditions.

The liquid stripping composition comprises a mixture of selected solvents present in controlled proportions to provide chemical attack and dissolution of the brittle lacquer coating and the underlying lacquer base coat without chemically attacking and leaching the constituents including plasticizers present in the underlying plastic substrate. The liquid stripping composition contains as its essential constituents, a halogenated solvent or mixture of halogenated solvents, a glycol ether or mixture of selected glycol ethers and mineral spirits, and may further preferably include controlled amounts of lower alcohols and a surfactant or wetting agent. The broad useable as well as preferred proportions of the constituents of the liquid stripping composition are set forth in Table 1.

TABLE 1

| Ingredient | Composition Liquid Stripping Material Percent by Weight | |
|---|---|---|
| | Useable | Preferred |
| Halogenated Solvent(s) | 5 – 30 | 10 – 20 |
| Glycol Ether(s) | 20– 40 | 25 – 35 |
| Mineral Spirits | 20 – 60 | 35 – 50 |
| Alcohol(s) | 0 – 10 | 2 – 8 |
| Surfactant(s) | 0 – 10 | 2 – 8 |

The halogenated solvent or mixture of halogenated solvents preferably comprises chlorinated hydrocarbons selected from the group consisting of trichlorethylene, methylene chloride, perchlorethylene; 1,1,1 trichloroethane and mixtures thereof. Of the foregoing chlorinated hydrocarbon solvents, the methylene chloride is the most active and when employed, can be used in amounts up to 10% of the stripping composition. The trichlorethylene and 1,1,1 trichloroethane chlorinated solvents are of an intermediate activity and when employed, can be used in amounts up to 20% of the stripping composition. The perchlorethylene solvent is of moderate solvency action and can be employed in amounts up to about 30% of the stripping composition. Preferably, the halogenated solvent is comprised of a mixture of two or more of the individual solvents to provide a blend comprising 5% to 30% of the stripping composition and preferably, in an amount of from about 10% to about 20%.

The halogenated solvent constituent of the stripping composition serves as a secondary solvent for miscellaneous constituents present in the brittle lacquer coating and the reflective undercoat and assists the solvent action of the glycol ether ingredient.

The glycol ether constituent of the stripping composition comprises the primary solvent for the film-forming constituents of the brittle lacquer coating and the reflective undercoat and may comprise one or a mixture of glycol ethers selected from the group as set forth in Table 2.

TABLE 2

| Ingredient | Initial Boiling Point at 760 mm Hg., °F |
|---|---|
| Ethylene Glycol Methyl Ether | 255.6 |

TABLE 2-continued

| Ingredient | Initial Boiling Point at 760 mm Hg., °F |
| --- | --- |
| Ethylene Glycol Ethyl Ether | 275.9 |
| Ethylene Glycol n-Butyl Ether | 340.0 |
| Diethylene Glycol Methyl Ether | 351.4 |
| Diethylene Glycol Ethyl Ether | 395.6 |
| Diethylene Glycol Ethyl Ether | 365.0 |
| Diethylene Glycol n-Butyl Ether | 446.0 |
| Propylene Glycol Methyl Ether | 248.2 |
| Dipropylene Glycol Methyl Ether | 370.9 |
| Tripropylene Glycol Methyl Ether | 468.3 |
| Ethylene Glycol Isobutyl Ether | 316.0 |
| Diethylene Glycol Isobutyl Ether | 422.0 |
| Propylene Glycol Isobutyl Ether | 342.8 |
| Ethylene Glycol Phenyl Ether | 477.7 |
| Propylene Glycol Phenyl Ether | 468.8 |

The glycol ethers can be employed in an amount ranging from 20% up to 40% of the stripping composition and preferably within a range of about 25% to about 35% thereof. The use of glycol ethers as set forth in Table 2 which are of a lower boiling point are preferably used in amounts corresponding to the lower limits of the permissible range, while conversely, use of glycol ethers of higher boiling points, as set forth in Table 2, are preferably employed in amounts approaching the upper limits of the permissible range specified. Particularly satisfactory results are obtained when using diethylene glycol n-butyl ether or ethylene glycol n-butyl ether within the preferred range as specified in Table 1.

The glycol ether constituent of the stripping composition is sufficiently active to chemically attack the underlying plastic substrate and the inclusion of a controlled quantity of mineral spirits in the formulation serves as a deactivator by forming a so-called "protective coating" or a diluent coating on the surface of the plastic substrate after a penetration of the stripping composition through the overlying lacquer coating and undercoating, thereby preventing any appreciable attack and a leaching of plasticizer constituents from the underlying plastic substrate. While a variety of mineral or oleum spirits can be employed for this purpose, it is preferred to employ those having a flash point ranging from about 110°F to about 160°F as measured by the Cleveland Open Cup test, and wherein the material contains appreciable amounts of aromatic compounds.

The use of a lower alcohol in the liquid stripping composition constitutes a preferred practice and quantities up to 10% of the stripping composition can be employed. The alcohol constituent serves as an activator for the glycol ether solvent by providing a better wetting action and penetration of the glycol ether into the brittle lacquer coating and the underlying undercoat. The alcohol constituent may comprise an alcohol selected from the group consisting of methyl alcohol, ethyl alcohol, isopropyl alcohol, butyl alcohol, as well as mixtures thereof. Of the foregoing, isopropyl alcohol employed in amounts of from about 2% to about 8% comprises a preferred practice.

The inclusion of a surfactant or wetting agent is optional but preferred because it facilitates the removal of the residual stripping solution from the plastic surface after completion of the stripping operation. The inclusion of a surfactant also aids in the compatibility of the mixture and an improved wetting by the stripping composition of the lacquer films being stripped. Any surfactant or wetting agent compatible with the mixture can be satisfactorily employed in amounts as great as 10%, while amounts of from about 2% to about 8% are preferred. The wetting agent may comprise any cationic, anionic or nonionic wetting agent soluble in the stripping composition, of which nonionic wetting agents with an organic base, such as nonyl phenol, di-alkyl phenol aliphatic, lauramide, coconut amides and fatty alcohols are preferred. Alternative wetting agents that can be satisfactorily employed include those with an organic base of alkyl sulfates commercially available under the trademark Stepanol; alkyl ether sulfates commercially available under the trademark Steol; alkylolamides commercially available under the trademarks Ninol and Stepan; sulfonates such as those commercially available under the brand name Bio Soft, Nacconol, Ninate, Stepantex and Stepantan; sulfonic acids such as those commercially available under the mark Bio Soft S-100; hydrotopes, commercially available under the designation Stepanate X and Stepanate AM; olefin sulfonates such as those available under the trademark Bio Terge; alkyl sulfoacetates available under the trademark Lathanol; and the like.

In the practice of the method, the liquid stripping composition is applied to the lacquer coating by brushing, flooding, spraying or immersion in a manner to effect a progressive dissolving of the brittle lacquer coating and the reflective undercoating. The removal of localized areas of the brittle lacquer coating and undercoating can simply be achieved by continuous application of the stripping composition by brush until all of the lacquer film has been removed, exposing the plastic substrate. When all of the brittle lacquer and undercoating is to be removed, the entire structure can conveniently be immersed in a receptacle containing the liquid stripping composition and can be agitated such as by ultrasonic vibration to accelerate the dissolution and removal of the coating material. At the completion of the stripping operation, any residual stripping composition can be wiped from the surfaces of the substrate and can be further cleaned with water or alcohol to provide a clean plastic surface.

In order to further illustrate the present invention, the following example is provided. It will be understood that the example is provided for illustrative purposes and is not intended to be limiting of the invention as herein described and as set forth in the subjoined claims.

EXAMPLE

A plastic prototype fabricated from rigid polyvinyl chloride plastic in an unfilled condition available from Union Carbide Corporation under the designation Type 3310 is coated with about one-thousandth inch of a reflective undercoat comprising an aluminumfilled nitrocellulose lacquer available from Magnaflux Corporation under the designation ST-840. The surface of the part is preliminarily cleaned with alcohol and dried prior to the application of the undercoat via an aerosol spray.

After air drying at ambient temperature for about onehalf hour, a brittle lacquer coating is applied by aerosol spray and comprises a commercially available coating from Magnaflux Corporation sold under the designation ST-70. The coating is applied to a thickness of about 0.004 inch and allowed to air dry at ambient temperature for at least 8 hours. The resultant coated structure is subjected to static loading, whereafter the stress coating and underlying base coat is removed in those areas evidencing critical stress patterns to permit installation of strain gauges for quantitative measurements by applying thereto a liquid stripping solvent containing 10% perchlorethylene, 7% 1,1,1 trichloroethane, 43% mineral spirits (150°F flash point, 99% aromatic), 30% diethylene glycol n-butyl ether, 5% isopropyl alcohol and 5% nonionic wetting agent (nonyl phenol sold under the designation Makon 6). The liquid stripping composition has a high flash point of 220°F rendering it safe for use in industrial and laboratory environments.

The stress coating and underlying base coat is removed from a local area of the structure by applying the liquid stripper by a brush to effect a continuous flooding of the surface, resulting in a progessive dissolution of the coatings on the substrate. At the completion of the stripping operation, the surface is wiped clean with alcohol and the strain gauge is attached by adhesives in the usual manner.

The liquid stripper is applied by a brush to another local area of the coated structure in a manner to effect a progressive dissolution of the stress coating to expose the underlying base coat. The stripping operation is discontinued after all of the underlying stress coating has been removed, retaining substantially all of the reflective base coat on the substrate. The surface of the reflective base coat is wiped clean with alcohol to remove any residual liquid stripper therefrom and a recoating of the stripped area is effected using the same aerosol spray of the brittle lacquer coating originally employed, enabling a retesting of the recoated area.

While it will be apparent that the invention herein described is well calculated to achieve the benefits and advantages as hereinabove set forth, it will be appreciated that the invention is susceptible to modification, variation and change without departing from the spirit thereof. What is claimed is:

1. The method of nondestructive testing of structures which comprise the steps of fabricating a model to accurate fullsize or fractional scale employing a rigid polyvinyl chloride plastic, applying a brittle lacquer coating to those surface areas of the model at which an evaluation of the stress gradient is to be investigated, loading the model to achieve a desired strain and a cracking of the said brittle lacquer coating in response to the strain of the underlying structural substrate, observing the brittle lacquer coating crack pattern as an indication of the concentration and direction of strain and thereafter removing all or selected portions of said brittle lacquer coating to render the model reuseable for future testing by applying a liquid stripping solution to the surface of said brittle lacquer coating to effect a solubilization and stripping thereof without injury and modification of the mechanical properties and dimensions of the underlying polyvinyl chloride substrate, said stripping solution comprising a mixture containing about 5% to about 30% of a halogenated solvent, about 20% to about 40% of a glycol ether, about 20% to about 60% mineral spirits, up to 10% of a lower alcohol and up to 10% of a surfactant.

2. The method as defined in claim 1, wherein said stripping solution comprises about 10% to about 20% of a halogenated solvent, about 25% to about 35% of a glycol ether, about 35% to about 50% mineral spirits, about 2% to about 8% of a lower alochol, and about 2% to about 8% of a surfactant.

3. The method as defined in claim 1, wherein said halogenated solvent is selected from the group consisting of trichlorethylene, methylene chloride, perchlorethylene, 1,1,1 trichloroethane, and mixtures thereof.

4. The method as defined in claim 1, wherein said glycol ether is selected from the group consisting of diethylene glycol n-butyl ether, ethylene glycol n-butyl ether and mixtures thereof.

5. The method as defined in claim 1, in which the mineral spirits has a flash point ranging from about 110°F to about 160°F and contains appreciable amounts of aromatic hydrocarbons.

6. The method as defined in claim 1, in which the alcohol is selected from the group consisting of methyl alcohol, ethyl alcohol, isopropyl alcohol, butyl alcohol and mixtures thereof.

* * * * *